United States Patent
Duwig et al.

(10) Patent No.: US 8,258,194 B2
(45) Date of Patent: *Sep. 4, 2012

(54) METHOD AND REACTOR FOR PERFORMING FISCHER-TROPSCH SYNTHESIS

(75) Inventors: Christophe Duwig, Malmö (SE); Poul Erik Højlund Nielsen, Fredenborg (DK); Max Thorhauge, Herlev (DK)

(73) Assignee: Haldor Topsoe A/S, Lyngby (DK)

( * ) Notice: Subject to any disclaimer, the term of this patent is extended or adjusted under 35 U.S.C. 154(b) by 140 days.

This patent is subject to a terminal disclaimer.

(21) Appl. No.: 12/809,016

(22) PCT Filed: Feb. 12, 2009

(86) PCT No.: PCT/EP2009/000973
§ 371 (c)(1), (2), (4) Date: Jun. 17, 2010

(87) PCT Pub. No.: WO2009/118080
PCT Pub. Date: Oct. 1, 2009

(65) Prior Publication Data
US 2010/0267848 A1    Oct. 21, 2010

(30) Foreign Application Priority Data

Feb. 25, 2008  (DK) .................................. 2008 00260
Feb. 25, 2008  (DK) .................................. 2008 00261
May 8, 2008    (DK) .................................. 2008 00652

(51) Int. Cl.
*C07C 27/00* (2006.01)
(52) U.S. Cl. ........................................................ 518/700
(58) Field of Classification Search .................. 518/700
See application file for complete search history.

(56) References Cited

U.S. PATENT DOCUMENTS

2003/0068260 A1  4/2003  Wellington et al.

FOREIGN PATENT DOCUMENTS

| EP | 0 737 646 A2 | 10/1996 |
| GB | 1 565 824 A | 4/1980 |
| WO | WO-98/04342 A1 | 2/1998 |

*Primary Examiner* — Jafar Parsa
(74) *Attorney, Agent, or Firm* — Dickstein Shapiro LLP

(57) ABSTRACT

Method and reactor for performing Fischer-Tropsch (FT) synthesis with controlled steam partial pressure by introducing cool points in the FT reactor, typically in form of cooled solid surfaces. At the surface, the low temperature will force condensation of the water into a liquid film. Thereby, the partial pressure of steam in the gas and reactor will not exceed significantly the vapor partial pressure at the liquid film and water from the gas stream will be removed as it is produced, i.e. steam induced deactivation is avoided. In addition, the decrease of hydrogen and carbon monoxide partial pressures due to dilution by steam will be kept low ensuring a constant high reaction rate.

6 Claims, 1 Drawing Sheet

METHOD AND REACTOR FOR PERFORMING FISCHER-TROPSCH SYNTHESIS

The Fischer-Tropsch (FT) process requires a synthesis gas stream consisting largely of carbon monoxide and hydrogen. Thus, gasification is the first step of coal liquefaction or production of Fischer-Tropsch fuels from biomass. By the process the synthesis gas is converted into higher hydrocarbons, carbon dioxide and water.

Traditional FT reactors operate as fixed bed or gas agitated reactors (slurries). Because of a better temperature control, hence potential optimization of the product quality, slurry reactors are a very popular choice. In addition, modern FT-catalysts based on cobalt or, ruthenium has shown good capability of forming long carbon chain molecules (typically more than 5 carbon atoms).

The FT synthesis is exothermic and reaction performance depends highly on the reaction temperature. High temperatures favour formation of methane and carbon deposition on the catalyst. It is therefore necessary to control the temperature and remove excessive from the reaction medium, which conventionally is accomplished by indirect heat exchange with a cooling medium in the reactor.

Despite of the progresses mentioned above, the FT reactors still suffer from limitations, the major one resulting from the sensitivity of any FT catalyst to steam. Indeed, the FT reactions forms one molecule of water per molecule of carbon monoxide converted. Since long chain hydrocarbons are the desired reaction product, it results in a significant increase of the steam concentration with potential impact on the catalyst activity. Deactivation of the FT catalyst induced by steam imposes to limit the partial pressure of steam, typically below ~6 bars and preferably far below. This is conventionally done by limiting the conversion (i.e. the water production) per flow through the reactor. At operating pressure ~20-30 bars, the carbon conversion per pass would not exceed 50% which requires a significant recycle stream and a reactor dimensioned accordingly i.e. larger than what would be needed given the catalyst activity only.

It has now been found that the reactor conversion rate (per kg/catalyst) in the known FT process may be increased and the reactor size reduced significantly, if the recycle stream is avoided by keeping the steam partial pressure low enough and the catalytic activity adequate.

In order to control the steam partial pressure, we suggest introducing cool points in the FT reactor, typically in form of cooled solid surfaces. At the surface, the low temperature will force condensation of the water into a liquid film. Therefore the partial pressure of steam in the gas and reactor will not exceed significantly the vapour partial pressure at the liquid film and water from the gas stream will be removed as it is produced i.e. we limit the steam induced deactivation. In addition, the decrease of hydrogen and carbon monoxide partial pressures due to dilution by steam will be kept low ensuring a constant high reaction rate.

In accordance with above findings, the present invention is a method of performing Fischer-Tropsch synthesis comprising the steps of reacting a synthesis gas containing hydrogen, carbon monoxide and carbon dioxide in a fixed bed reactor of FT synthesis catalyst particles being indirectly cooled with a cooling agent, and
condensing water as it is formed in the reactor on a cooling surface by adjusting the liquid cooling agent to provide a temperature between 50° C. and 190° C.

To achieve efficient water condensation at the cold area and adequate heat removal from the catalytic bed, different approaches can be used. However, all possible configurations will consist of inserting an ensemble of cooled surfaces in the reactor(s) ensuring that any catalytic region will be in the vicinity of a cooled surface. For example, one might pack the catalyst particles into narrow tubes which are surrounded on the outside by a cooling agent and a high flow of synthesis gas is passed through the tubes. Alternatively, one may use a packed bed reactor with internal elements in which the cooling agent circulates. These elements can have various shapes as long as they provide adequate cooling and ensure that any catalytic region will be in the vicinity of a cooled surface.

The operating pressure and temperature in the reactor (relatively far from the cool surfaces) should be kept in a range so that the catalytic activity is adequate for enabling high conversion.

Catalysts mostly employed in industrial FT plants and suitable for use in the invention are metal based; typically iron, ruthenium or cobalt based catalysts. Although iron has been widely used in the past, modern catalysts are often based on cobalt and show the best performances in term of selectivity.

Depending on the particular catalyst, the process can be performed either at low or high temperature process. When using an iron based catalyst high operating temperatures of 300-350° C. may be chosen and lower operating temperatures of 200-240° C. with either an iron or a cobalt catalyst.

Fixed bed reactors are appropriate for operating temperatures in the range of 180-350° C.

The total operating pressures may vary between about 1 MPa and 6 MPa. When employing an iron based catalyst, high pressures are preferred as the productivity of that catalyst increases with the operating pressure. However, one may choose an adequate operating pressure given the catalyst activity, the cost of the reactor and the maximum allowed steam partial pressure. Therefore, fixing the operating pressure, it is required that the temperature of the cool points is low enough at a given total operating pressure to ensure condensation of the steam.

Indeed, the surface area of the cool points and their temperature control the condensation rate which should balance the water production rate by the FT synthesis. However, the heat losses at the cool points should be balanced by the heat release of the FT reactions keeping the reactor temperature steady as reactions proceed. The temperature difference between the liquid film (cold for enabling condensation) and the reactor (hot to maintain rapid reactions) is sustained by the heat of reaction and condensation. A non-dimensional criterion summarizing these balances is presented in the following section.

In an embodiment of the invention, at least part of the catalyst temperature is maintained above dew point of the water by adjusting area of the cooling surface (ACOOL) at the provided temperature of the cooling agent in such way that the ratio of settled catalyst bulk volume (VCAT) to the cooling surface area (ACOOL) is between 0.01 m and 0.125 m.

In further an embodiment of the invention, the temperature of the FT catalyst particles is maintained above the dew point of water by a heating agent including pressurized water with a boiling point between 180° C. and 280° C., steam with a dew point between 180° C. and 280° C. or a mixture thereof. The heating agent is passed through an internal heating means having a surface area so that ratio of the surface of heating means to the surface of the cooling area is between 0.3 and 3.0.

Preferably, the average temperature of the cooling agent is between 100° C. and 180° C. and the ratio of settled catalyst bulk volume (VCAT) to the cooling surface area (ACOOL) is between 0.01 m and 0.125 m.

The average temperature is defined as the cooling agent temperature after having received half of the total transferred heat.

Furthermore, the invention provides a reactor being useful in the above described method for performing FT synthesis.

DETAILED DESCRIPTION OF THE PREFERRED EMBODIMENTS

In one embodiment the reactor comprises within a common shell a fixed bed of FT catalyst particles and cooling means adapted to indirectly cooling a FT synthesis gas with a cooling agent, wherein ratio of settled catalyst bulk volume to cooling surface area of the cooling means (VCAT/ACOOL) of the cooling means is between 0.01 m and 0.125 m, at a temperature of the cooling agent between 50° C. and 190° C.

In a further embodiment the reactor comprises within a common shell a fixed bed of a methanol catalyst particles and cooling means adapted to indirectly cooling a FT synthesis gas with a cooling agent and heating means adapted to indirectly maintaining temperature of the FT catalyst with a heating agent, wherein surface ratio of the surface of the heating means to the cooling means (VCAT/ACOOL) is between 0.3 and 3.0.

In still an embodiment the reactor further comprises internal liquid film stabilizing equipment adjacent to surface of the cooling means. Liquid film stabilizing equipment is used in order to avoid entrainment of the condensed water into the catalyst bed, and is installed between the catalyst and the cooling surface. The preferred liquid film stabilizers are selected from a wire mesh, a metal spiral, a metal helix, a porous fibre mat, longitudinal finned cooling surface.

In order to present a criterion, we will estimate and compare rates (production, transport, etc.) in the reactor.

The terms involved are:

The condensation rate at the cool points is Rcond~k(Y−Y*) where k is a transport coefficient, Y denotes the mass fraction of $H_2O$, and

* stands for vapour variables defined as in equilibrium with the liquid film.

The heat release Hrelease~H·r where

H is the enthalpy of reaction, and r is the production rate of $H_2O$.

If all water produce is condensed at the wall, we have Hrelease~H·k(Y−Y*). Indeed, this relation can be obtained by adjusting the cooling surface area and catalyst volume independently for a given catalytic activity.

The heat losses at the wall/film are Hlosses~k Cp (T−T*), where T and T* denotes the temperature in the gas and in the liquid film, respectively.

We define A comparing the heat release and heat losses: A~(H(Y−Y*))/(Cp (T−T*)). We require A>1 for avoiding excessive cooling.

EXAMPLE 1

In a reactor operating at P=20 bar with an averaged temperature in the catalyst bed of T=210° C. fed and a hydrogen/carbon monoxide mixture having $H_2/CO$=2, the cooled surface temperature was set at 147° C. The reactants are converted by:

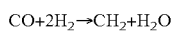

$CH_2$ reacts further to produce long carbon chain molecules. The reaction is exothermic (enthalpy of reaction is —H=−165 kJ/mol), while the calorific capacity of the mixture varies with the carbon conversion in the range Cp~30-50 J/mol/K.

Figure 1:
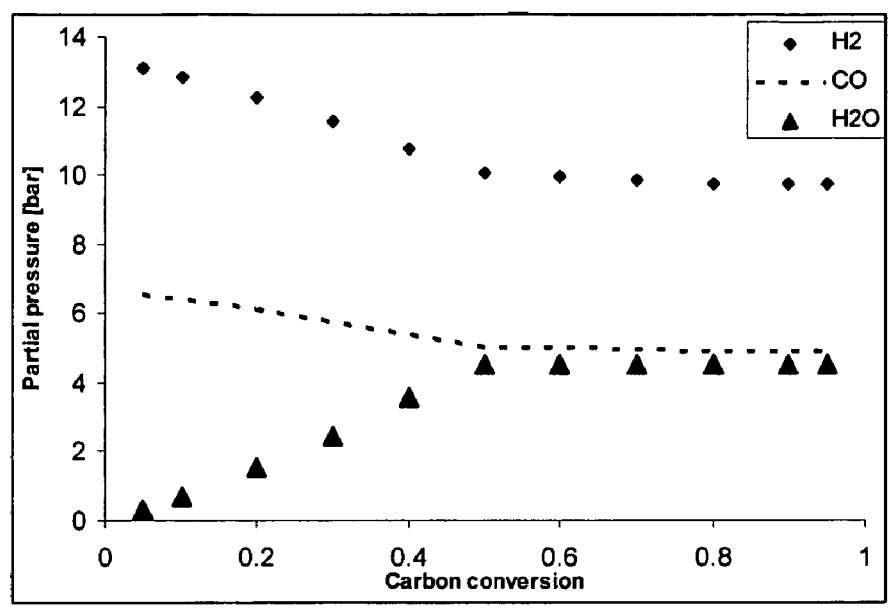
FIG. 1 is a plot of the partial pressure of different species as a function of the carbon conversion for a forst example of the invention.

FIG. 1 of the drawings plots the partial pressure of different species as function of the carbon conversion. At conversions lower than 0.5, the partial pressures vary linearly with the conversion, water is produced and accumulates in the gas phase as reactants are consumed. At conversion ~0.5, the film condensation start and the partial pressure of water stabilizes at 4.5 bars below the upper limit (taken here to be ~6 bars). Reaction proceeds to almost complete conversion keeping the reactant partial pressures high and constant. For this case, we estimate the non-dimensional number A to be A~1.3 at conversion 0.5 and increasing as reaction proceeds in the reactor so that the catalyst temperature is suitable for FT synthesis.

EXAMPLE 2

In a reactor operating at P=35 bar with an averaged temperature in the catalyst bed of T=210° C. fed and a hydrogen/carbon monoxide mixture having $H_2/CO$=2, the cooled surface temperature was set at 155° C. The reactions are similar than in Example 1.

Figure 2:
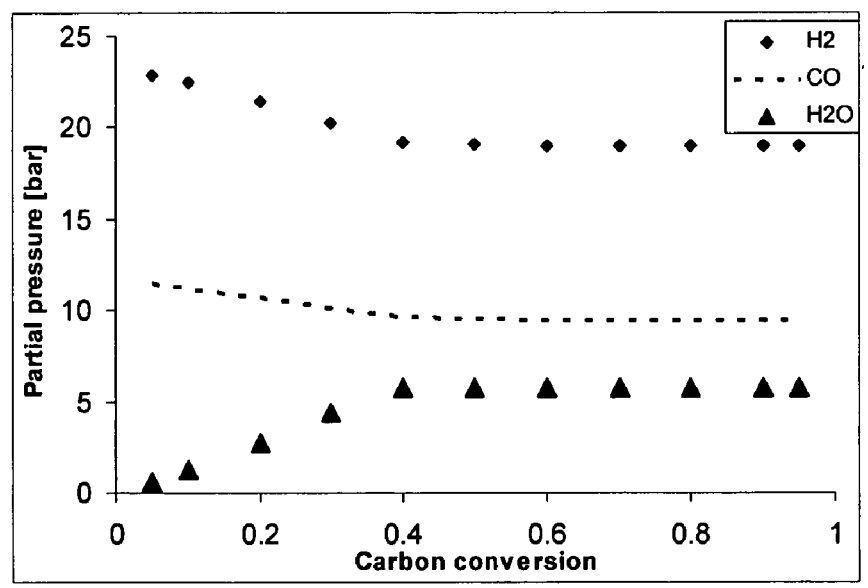
FIG. 2 is a plot of the partial pressure of different species as a function of the carbon conversion for a second example of the invention.

FIG. 2 of the drawings plots the partial pressure of different species as function of the carbon conversion. At conversions lower than 0.4, the partial pressures vary again linearly with the conversion, water is produced and accumulates in the gas phase as reactants are consumed. At conversion ~0.4, the film condensation start and the partial pressure of water stabilizes at 5.7 bars below the upper limit (also taken here to be ~6 bars). Reaction proceeds to almost complete conversion keeping the reactant partial pressures high and constant. For this case, we estimate the non-dimensional number A to be A~1.3 at conversion 0.4 and increasing as reaction proceeds in the reactor so that the catalyst temperature is suitable for FT synthesis.

The advantages of the condensing reactor compared to conventional techniques are:

Remove the recycle stream and lowers the size of the equipment (both compressor and reactor) i.e. the erection costs.

Decrease the water content of the gas phase, which allows operations at higher pressures/catalytic activities or/and maintain a relatively constant reactant partial pressures in the reactor.

The removal of water also decreases the gas flow velocity reducing the pressure drop per unit length significantly in the region of high conversion. It allows using small catalyst particles, the intra particle diffusion limitation decreases as the reactivity increases, while keeping the pressure drop reasonable.

Without recycle loop, there is no accumulation of inert species and the demand on synthesis gas composition are lower i.e. the synthesis gas preparation can be simplified (cost-reduced) without significant loss of conversion efficiency.

The invention claimed is:

1. A method of performing Fischer-Tropsch (FT) synthesis, comprising the steps of reacting a synthesis gas containing hydrogen, carbon monoxide and carbon dioxide in a fixed bed reactor of FT synthesis catalyst particles being indirectly cooled with a cooling agent, and condensing water as it is prepared on a cooling surface by adjusting pressure of the cooling agent to provide a boiling point (TBW) of the cooling agent between 50° C. and 190° C.

2. A method of performing Fischer-Tropsch (FT) synthesis, comprising the steps of reacting a synthesis gas containing hydrogen, carbon monoxide and carbon dioxide in a fixed bed reactor of FT synthesis catalyst particles being indirectly cooled with a cooling agent, and condensing water as it is prepared on a cooling surface by adjusting the temperature of the liquid cooling agent between 50° C. and 190° C.

3. A method according to claim 1, wherein at least part of the catalyst temperature is maintained above dew point of the water by adjusting area of the cooling surface (ACOOL) at the provided boiling point of the cooling agent in such way that the ratio of settled catalyst bulk volume (VCAT) to the cooling surface area (ACOOL) is between 0.01 m and 0.125 m.

4. A method according to claim 3, wherein temperature of the FT catalyst particles is maintained above the dew point of water by a heating agent including pressurized water with a boiling point between 180° C. and 280° C., steam with a dew point between 180° C. and 280° C. or a mixture thereof, the heating agent being passed through an internal heating means having a surface area so that ratio of the surface of heating means to the surface of the cooling area is between 0.3 and 3.0.

5. A method of claim 1, wherein the boiling point of the cooling agent is between 100° C. and 180° C. and the ratio of settled catalyst bulk volume (VCAT) to the cooling surface area (ACOOL) is between 0.01 m and 0.125 m.

6. A method of claim 2, wherein the average temperature of the liquid cooling agent is between 100° C. and 180° C. and the ratio of settled catalyst bulk volume (VCAT) to the cooling surface area (ACOOL) is between 0.01 m and 0.125 m.

* * * * *